United States Patent [19]

Coppe

[11] Patent Number: 4,863,185
[45] Date of Patent: Sep. 5, 1989

[54] UNIVERSAL TRAILER HITCH APPARATUS

[76] Inventor: Dino L. Coppe, 10170 Richwood Dr., Cupertino, Calif. 95014

[21] Appl. No.: 216,312

[22] Filed: Jul. 7, 1988

[51] Int. Cl.⁴ ............................................. B60D 1/06
[52] U.S. Cl. ................................. 280/491.2; 280/511
[58] Field of Search .................... 280/433, 511, 490 R, 280/491 A, 490.1, 491.2, 491.5

[56] References Cited

U.S. PATENT DOCUMENTS

| | | | |
|---|---|---|---|
| 1,255,222 | 2/1918 | Potts | 280/511 |
| 2,549,178 | 4/1951 | Dear | 280/511 |

FOREIGN PATENT DOCUMENTS

| | | | |
|---|---|---|---|
| 516467 | 9/1955 | Canada | 280/511 |
| 861800 | 1/1953 | Fed. Rep. of Germany | 280/511 |
| 230654 | 3/1925 | United Kingdom | 280/511 |
| 644159 | 10/1950 | United Kingdom | 280/511 |
| 1548991 | 7/1979 | United Kingdom | 280/511 |

*Primary Examiner*—John A. Pekar
*Attorney, Agent, or Firm*—John J. Leavitt

[57] ABSTRACT

Presented is a trailer hitch apparatus or assembly that marries a spherical ball to a monolithic plug that may be detachably locked in a complementary socket fixed to a tractor vehicle. In another aspect of the invention, the spherical ball attached to the monolithic plug is permanently pivotally mounted on the tongue of a trailer-type vehicle.

10 Claims, 4 Drawing Sheets

UNIVERSAL TRAILER HITCH APPARATUS

BACKGROUND OF THE INVENTION

1. Field of the Invention.

This invention relates to trailer hitches for hitching trailer vehicles to tractor vehicles, and more particularly relates to trailer hitch apparatus that may be universally applicable to any tractor vehicle equipped to tow a trailing vehicle, such as a trailer.

2. Description of the Prior Art.

The prior art relating to this invention is believed to be contained in Class 280, sub-classes 415A; 415R; 474; 477; 491A; 491E; 500; 501; 511; 514; and 515.

As a result of a search in the area indicated, the following United States patents were found and examined in connection with the preparation of this application: U.S. Pat. Nos. 2,570,933; 2,838,327; 2,871,030; 2,872,213; 3,271,050; 4,239,253; 4,248,450; 4,280,713; 4,546,994.

Referring to each of the patents above in the order in which they were issued, U.S. Pat. No. 2,570,933 is directed to a trailer hitch assembly formed in two sections, one of the sections constituting a permanently attached section that remains always attached to the underside of the vehicle and out of sight so as not to detract from the appearance of the vehicle, while a second section constitutes a detachable section adapted to be removably attached to the first permanently attached section.

U.S. Pat. No. 2,838,327 embodies a cylindrical receptacle within which is detachably secured by a pin the connector tube on which is mounted the trailer hitch ball. As illustrated in FIG. 5 of this patent, the connector tube may be rotated through 90 degrees to place the ball in a lower position and projecting to one side so as to leave the license plate numbers of the towing vehicle exposed. There is no suggestion in this patent of an auxiliary connector socket on the main connector tube to receive a complimentarily configured plug on which a ball may be mounted.

U.S. Pat. No. 2,871,030 is also directed to a trailer hitch assembly, and particularly to one which provides a flexible connection between the trailer and the tractor, allowing angling around three mutually perpendicular axis.

U.S. Pat. No. 2,872,213 is directed to a trailer hitch assembly that facilitates the permanent attachment of two balls of different sizes to the trailer hitch assembly. In this structure, the ball support plate is bored to receive the shanks of two different balls, the shanks being axially aligned but projecting from opposite sides of the plate. The plate is provided with flanges that permit 180 degree pivotal repositioning of the ball support plate and detachable attachment thereof to an appropriate support bracket mounted on the tractor vehicle.

U.S. Pat. No. 3,271,050 is directed to a trailer hitch assembly in which the conventional connector tube with the ball thereon is removed and replaced by an auxiliary connector tube on which is rotatably mounted a hardened steel wheel for the purpose of protecting the trailer hitch receptacle tube when the vehicle, without the trailer attached, passes over dips or depressions in the roadway, which might bring the receptacle tube into contact with the pavement.

U.S. Pat. No. 4,239,253 relates to a structure categorized as a body extender, and includes a pivotal connection between two parallel frame members that permit pivotal movement of the trailer about a horizontal axis, but do not appear to permit pivotal action of the trailing vehicle about a vertical axis.

U.S. Pat. No. 4,248,450 discloses a structure for mounting a multiplicity of trailer hitch balls on a tractor vehicle. The balls, extending in four different directions, are mounted on a square tube that is rotatably mounted on a heavy cylindrical pin permanently connected to the tractor vehicle. The square tube is rotatably mounted on the heavy pin, and a removable lock pin is provided to prevent relative rotation of the ball mounting square tube in relation to the heavy pin when a particular ball has been selected for use.

U.S. Pat. No. 4,280,713 is directed to a trailer hitch assembly in which the conventional receptacle tube which is permanently attached to the vehicle is adapted to releasably receive either a straight connector tube as illustrated in FIGS. 5 and 6 and on which a ball may be mounted, or a vertical offset connector tube 28 having upper and lower tube extensions 32 and 34. The upper tube extension is releasably secured in the receptacle by a pin. The lower tube extension is utilized to releasably mount the square body member or tube 42 by means of a pin, and on which the balls 54 of different sizes may be mounted.

U.S. Pat. No. 4,546,994 relates to the type of trailer hitch assembly commonly known as a "fifth wheel" in which the hitch ball is mounted within the bed of a pickup truck. In this construction, the receptacle tube is square and its axis is vertical instead of horizontal. The upper end of the receptacle tube is welded to a plate that is bolted to the bed of the pickup truck and to the framework underneath the bed. The trailer hitch ball is mounted on a plate which is in turn welded permanently to the upper end of the connector tube, which is square in cross-section and dimensioned to pass snugly through the plate and into the square vertical receptacle tube. The connector tube with ball attached is releasably held by an appropriate pin.

It is one of the object of the present invention to provide a trailing vehicle, such as a trailer, with a tongue assembly, including a trailer hitch portion that is permanently attached to the trailing vehicle tongue and which may be universally attached for pivotal movement to any tractor vehicle equipped with a conventional rectangular or square receptacle tube.

Another object of the invention is the provision of an adaptor constituting a connector tube adapted to be releasably attached to the conventional receptacle tube permanently attached below a tractor vehicle, and which will universally interface and cooperate with the trailer hitch ball permanently and pivotally attached to the trailing vehicle tongue.

Still another object of this invention is the provision of a tailer hitch ball permanently mounted on a plug member adapted to slidably engage a socket, and between which means are provided for releasably locking the plug in the receptacle socket.

The invention possesses other objects and features of advantage, some of which, with the foregoing, will be apparent from the following description and the drawings. It is to be understood however that the invention is not limited to the embodiments illustrated and described, since it may be embodied in various forms within the scope of the appended claims.

SUMMARY OF THE INVENTION

In terms of broad inclusion, one aspect of the invention includes a trailer hitch ball permanently attached to the tongue of a trailer-type vehicle, the trailer hitch ball being attached to the tongue of the trailer vehicle for pivotal movement about three different axes. A shank in the form of a non-threaded boss extends radially outwardly from one periphery of the ball, and is permanently welded to a plug member adapted to sidably engage a socket and incorporating means for detachably locking the plug member in the socket.

In another aspect, the invention includes modification of a conventional trailer hitch plate by the permanent attachment thereto of a socket member adapted to slidably receive the plug member of a trailer hitch ball as previously described. Means are provided for detachably locking the trailer hitch ball with permanently attached plug within the socket that receives it.

In a third aspect of the invention, a connector tube is provided adapted to be detachably secured in the conventional receptacle tube commonly found mounted below the rear bumper of a tractor-type vehicle, such as an automobile. Permanently mounted on the free end of the connector tube is a socket member adapted to slidably receive the plug member of a trailer hitch ball assembly adapted to be releasably secured within the socket member.

It frequently happens that the height of the conventional receptacle tube permanently mounted on a tractor vehicle is not appropriate to the height of the tongue of a trailing vehicle. In a fourth aspect of the invention, there is provided a trailer hitch assembly including a connector tube adapted to be detachably secured in the conventional receptacle tube, and having on its free end, a sleeve having a transversely extending bore, the sleeve preferably having a square cross section, and being adapted to snugly slidably receive therewithin a vertically extending tube on one end of which is mounted a transverse extension provided with a socket, the socket being adapted to snugly slidably receive a universal ball and plug assembly for detachable detachment to the extension. Thus, multiple bores on the vertically extending tube may be selectively aligned with the transverse bore in the sleeve, and a detachable pin extended through the aligned bores to adjust the height of the trailer hitch ball in relation to the receptacle tube of the tractor vehicle.

BRIEF DESCRIPTION OF THE DRAWINGS

FIGS. 1 and 2 represent relatively recent innovations in the technology of connecting a trailer tongue to a tractor vehicle equipped with a ball-type trailer hitch assembly.

DESCRIPTION OF THE PREFERRED EMBODIMENT

Figure 1:
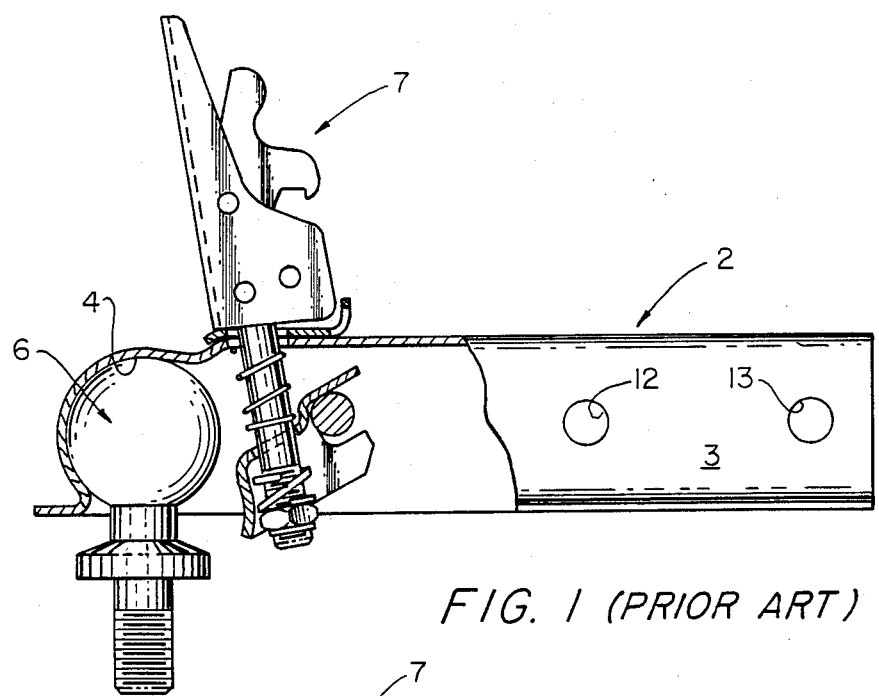
FIG. 1 is an elevational view partly in vertical section illustrating a conventional tongue assembly of a trailer type vehicle, the trailer hitch ball being shown in operative relation with the trailer tongue, and the latching mechanism being shown in an unlatched condition.
Figure 2:
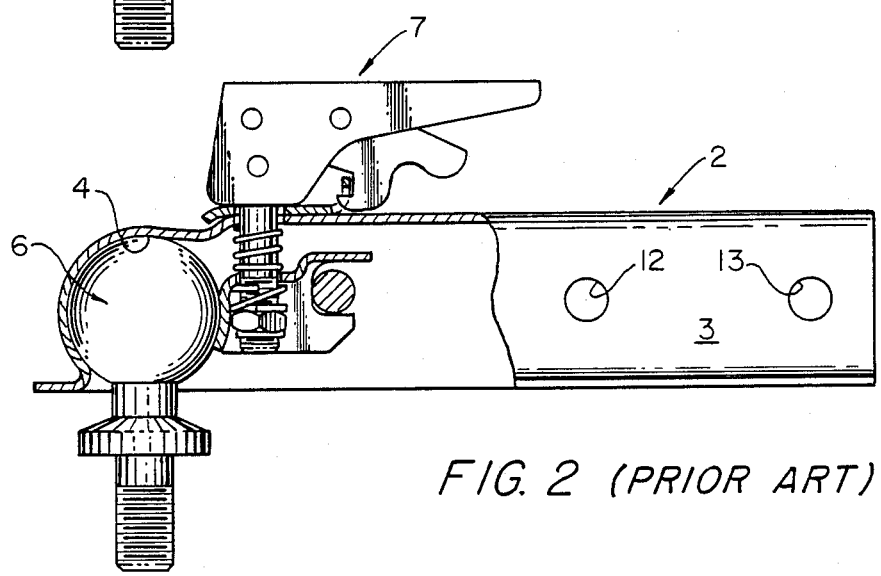
FIG. 2 is a view similar to FIG. 1, but showing the latch mechanism in a latched condition to lock the trailer hitch ball to the trailer tongue.

In terms of greater detail, and referring to FIGS. 1 and 2, it will there be seen that, conventionally, trailers or trailing vehicles are provided with a tongue member designated generally by the numeral 2, frequently a channel member having flanges 3 on opposite sides adapted to be permanently attached either by bolting or by welding to an elongated tongue member (not shown) the other end of which is attached to the frame of a trailer vehicle. The extreme end of the channel member adapted to be connected to the trailer vehicle is formed with a semi-spherical recess 4 adapted to receive the spherical trailer hitch ball 6, and a latch mechanism designated generally by the numeral 7 is adapted to either latch the ball in operative position as illustrated in FIG. 2, or to release the trailer hitch ball from the trailer tongue as illustrated in FIG. 1.

It will of course be obvious that with this conventional type trailer-to-tractor attachment mechanism, the trailer hitch ball is usually permanently attached to the tractor vehicle, while the complementary tongue portion assembly of the trailer hitch is permanently attached to the trailer vehicle.

Figure 3:
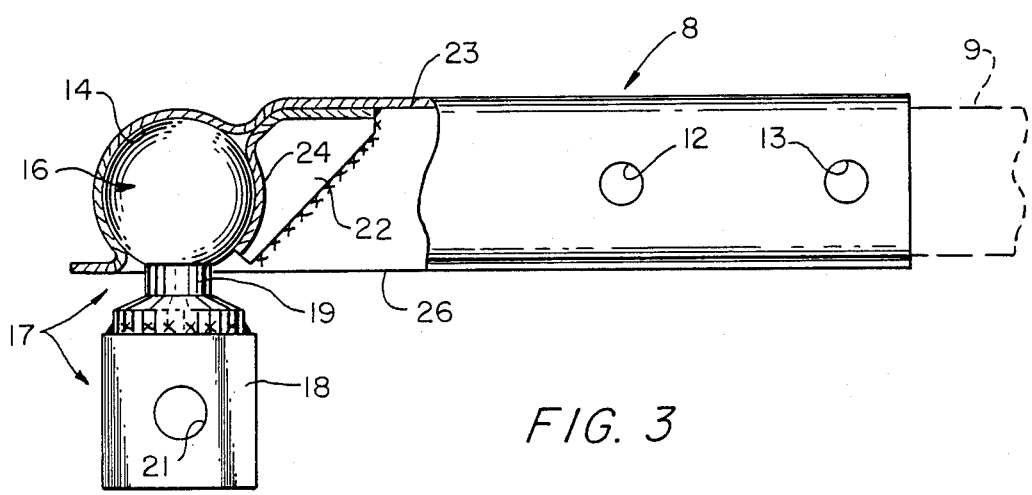
FIG. 3 illustrates one embodiment of the present invention, in which the spherical ball portion of the trailer hitch assembly is permanently and pivotally secured to the trailer tongue and the spherical ball is integral with a monolithic plug having a transverse bore and a cross-sectional configuration that is complementary to a socket in which the monolithic plug is detachably secured.

Referring to FIG. 3, it will there be seen that the tongue portion 8 which is permanently attached to an elongated tongue member 9 the opposite end of which remote from the tongue portion 8 is connected to the frame of the trailer vehicle, is also conveniently channel-shaped and provided with transverse bores 12 and 13 through which an appropriate bolt or rivet may extend in order to attach the tongue portion 8 to tongue member 9. The channel-shaped tongue portion 8 at its end remote from the elongated tongue member 9 is formed to provide a semi-spherical recess 14 within which is pivotally seated the spherical head 16 of a trailer hitch assembly designated generally by the numeral 17 and including a plug portion 18 welded integrally to one periphery of the spherical ball 16 through the intermediary of a cylindrical boss 19. The plug portion 18 is preferably square in cross-section and is provided with a transverse bore 21 for purposes which will hereinafter be explained. The plug may be tubular and cylindrical as well.

Contrasting the structure illustrated in FIG. 3, which is the preferred arrangement, with the constructions illustrated in FIGS. 1 and 2, it will be noted that the spherical ball 16 is permanently trapped in the recess 14 by virtue of the bracket 22 suitably welded to the web 23 of the channel member from which the tongue portion 8 is formed, with one portion 24 of the bracket extending transversely across the channel between the webs 3 and spherically configured to conform to the exterior spherical surface of the trailer hitch ball 16. Instead of welding, the bracket may be bolted or riveted in place.

With this construction, as illustrated in FIG. 3, it will be noted that the trailer hitch assembly 17 is permanently attached to the trailer hitch member 8 as distinguished from the construction in FIGS. 1 and 2 in which the trailer hitch ball is detachably mounted in the tongue portion 2. Thus, all that is required with the construction illustrated in FIG. 3, is that means be provided to receive the plug portion 18 to make a very secure connection of the tongue assembly 8-9 to a towing vehicle. Since it is inevitable that there will be pivotal movement of the spherical ball 16 within the spherical recess 14 of the tongue portion 8, it is important that there be clearance between the trailer hitch assembly plug portion 18 and the bottom edge 26 of the channel member from which the tongue portion 8 is formed. For this purpose, the cylindrical boss 19 provides the necessary clearance as clearly illustrated in FIG. 3 and functions also to rigidly and integrally connect the spherical ball to the plug portion.

Figure 4:
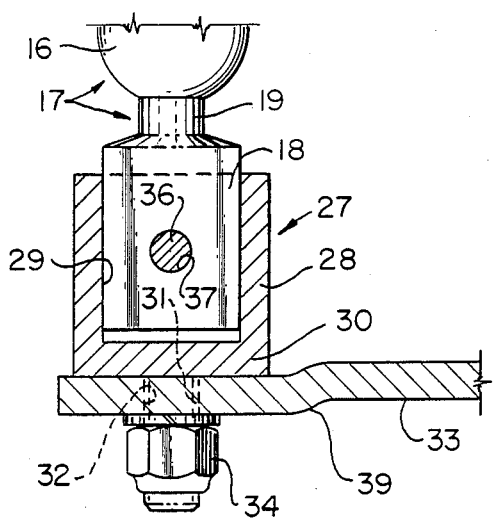
FIG. 4 is a fragmentary sectional view partly in elevation illustrating another embodiment of the invention constituting a socket member detachably secured to a conventional trailer draw bar, the socket member having detachably mounted therein a trailer hitch assembly in which the monolithic plug portion complements in configuration the socket into which it is snugly inserted and adapted to be detachably secured.
Figure 9:
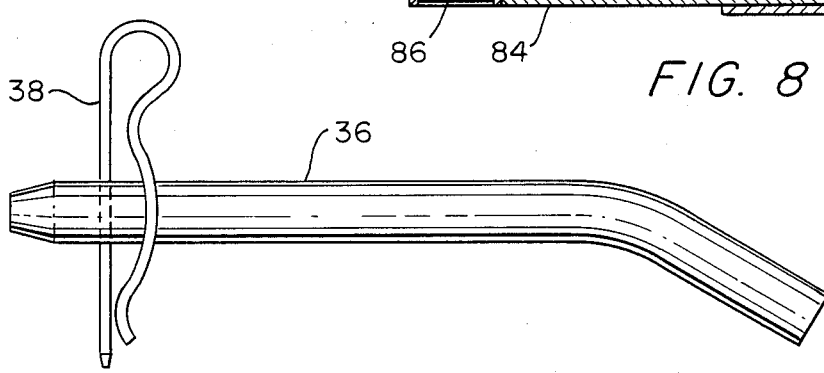
FIG. 9 is a side elevational view of a conventional lock pin and a detachable clip for locking the pin in engaged position in the trailer hitch assembly.

Referring to FIG. 4, the trailer hitch assembly 17 comprising the spherical ball 16 and the plug portion 18, is caught in a socket designated generally by the numeral 27 and preferably comprising a generally square tube 28 having interior surfaces 29 that conform to the generally square cross-sectional configuration of the trailer hitch plug portion 18, the two parts being dimensioned to provide a snug slip fit of the plug portion 18 within the interior of the square tube 28. The base 30 of the square tube 28 is integrally welded to the tube to form a unitary socket structure from the base of which projects a threaded spindle 31 adapted to extend through an aperture 32 formed in a trailer hitch plate 33 the opposite end of which is securely and permanently fastened to the towing vehicle. The socket member 28 is detachably secured to the trailer hitch plate 33 by an appropriate nut 34. As illustrated, the trailer hitch assembly 17 is detachably secured in the socket 28 by means of a detachable pin 36 adapted to extend transversely through appropriate apertures in the opposite sidewalls 28 of the socket member 27 and through the plug portion 18. Such a removable pin 36 is illustrated in FIG. 9. Once inserted through the socket member 27 and the plug portion nested therewithin, the removable pin 36 is locked in place by a removable resilient clip 38 as illustrated in FIG. 9.

It will thus be seen from FIGS. 4 and 9, that the trailer hitch assembly 17 as illustrated in FIG. 3 and used in that embodiment as a permanent adjunct to the trailer hitch assembly depicted therein, is used without the tongue portion 8 in FIG. 4 and detachably secured in the socket member 27. The socket member is in turn detachably secured to the trailer hitch plate 33 which is a very common structural support member on which a trailer hitch ball such as depicted at 6 in FIGS. 1 and 2 is usually attached. With the system illustrated in FIG. 4, it will be obvious that if the trailer hitch assembly 17 is connected to a conventional trailer hitch tongue portion as depicted in FIGS. 1 and 2, the latch mechanism 7 may be closed about the spherical head 16 of the trailer hitch assembly and locked in place with an appropriate padlock and thus left in that condition. Thereafter, the socket member 27 is detachably attached to a trailer hitch plate 33, which is a conventional structure, and the plug portion 18 of the trailer hitch assembly 17 may then be slidably received in the socket 27 and detachably secured therein by the pin 36 as previously described. When installed, the assembly as illustrated in FIG. 4, including the detachable socket member 27, is prevented from rotating in relation to the plate 33 by an appropriate jog 39 formed in the plate 33. In instances where the plate is not provided with a jog, it is usual that other structure closely abuts the exterior surface of the socket 27, thus preventing rotation of the socket during use. However, even where such structure is not present, there will usually be no tendency for the socket 27 to rotate so long as the nut 34 is cinched down tight since the frictional resistance between the base 27 and the surface of the plate 33 is orders of magnitude greater than any frictional resistance that exists between the ball 16 and the recess in which it is seated when connected to a trailer tongue.

Referring to the embodiment of the invention illustrated in FIG. 5, it will there be seen that provision is made for mounting the trailer hitch assembly 17, comprised of the spherical ball 16 and the plug portion 18, detachably, alternatively, in positions above or below the plane P of the draw bar designated generally by the numeral 41 and in this instance being illustrated as a generally rectangular cross-section tubular member appropriately welded or otherwise secured to the frame of the tractor vehicle. Obviously, instead of a rectangular box section, the draw bar 41 could be fabricated from an appropriate U-shaped channel member. It should be noted that the plane P is generally positioned medianly of the top surface 42 and the lower surface 43 of the draw bar 41. Additionally, it should be noted that the side walls 44 and 46 of the draw bar, which, in the case of a channel, would constitute integral flanges instead of side walls, are provided with aligned apertures 47 symmetrical about a horizontal axis that passes through both side walls 44 and 46.

Mounted on the end of the draw bar 41 remote from the vehicle to which it is attached, is a sleeve 48, welded in an appropriate aperture formed in the top and bottom walls 42 and 43, and welded therein as shown to provide a sleeve arranged vertically with respect to the draw bar 41, and having a longitudinal axis 49. The sleeve 48 is preferably square in cross-section, and is adapted to slidably receive a complementarily configured and dimensioned elongated mounting tube 51, also preferably square in cross-section, and having transversely extending apertures 52 spaced along the longitudinal axis of the tube 51 at intervals, the apertures 52 being adapted to axially coincide with the apertures 47 formed in the side walls 44 and 46 of the draw bar 41 when the tube 51 is adjusted in its elevation to effect registry of these apertures. With a given set of apertures registered, the tube 51 is retained in its elevated or adjusted position by the insertion through the aligned apertures of a removable pin 36 locked in place as before with a removable spring clip 38.

Figure 5:
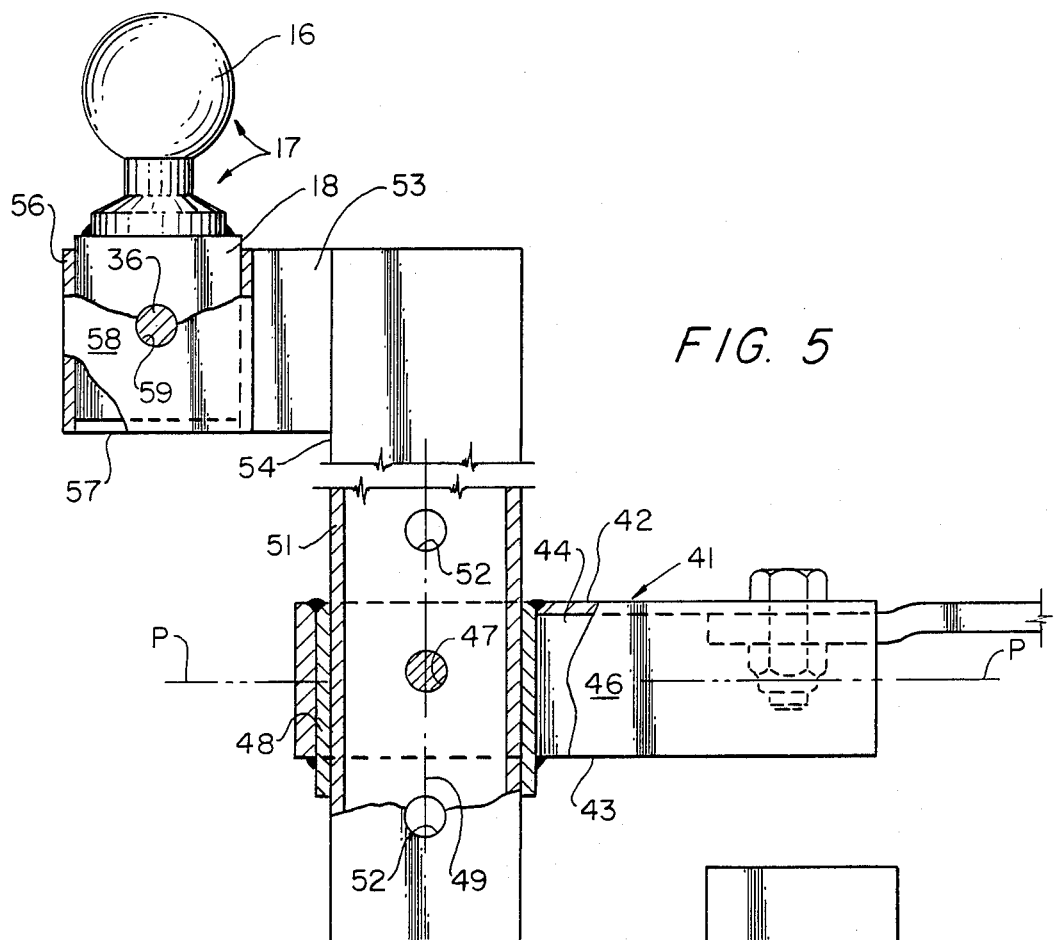
FIG. 5 is a side elevational view, parts of the structure being illustrated in vertical section, illustrating an embodiment of the invention in which a connector channel adapted to be detachably secured to a conventional draw bar, is provided with an open-ended socket sleeve on its outer end, the sleeve being adapted to adjustably and detachably support a trailer hitch ball mounting structure.

Referring to FIG. 5, it will there be seen that mounted on one end portion of the tube 51 is a spacer block 53, appropriately welded to the surface 54 of the side wall of the tube 51, the spacer block 53 being integrally interposed between the upper end portion of the tube 51 and a second sleeve 56 welded to the surface of the spacer block 53. The sleeve 56 is preferably arranged so as to have a vertical axis parallel to the axis 49, and is provided with opposite side walls 57 and 58 having aligned apertures 59 extending through the side walls 57 and 58 and being adapted to be placed in registry with the bore 21 formed in the trailer hitch plug portion 18 as illustrated. When so arranged, it will be seen that the removable pin 36 as illustrated in FIG. 9, may be inserted through the aligned apertures and bore 21 to detachably lock the trailer hitch assembly 17 in the sleeve 56. In this manner, the trailer hitch ball 16 will be seen to be elevated above the plane P by whatever degree is necessary for any given situation, it being noted that the trailer hitch ball may be elevated or lowered, depending upon placement of the apertures 52 in the tube 51 in relation to the apertures 47 formed in the side walls 44 and 46 of the draw bar 41.

Figure 6:
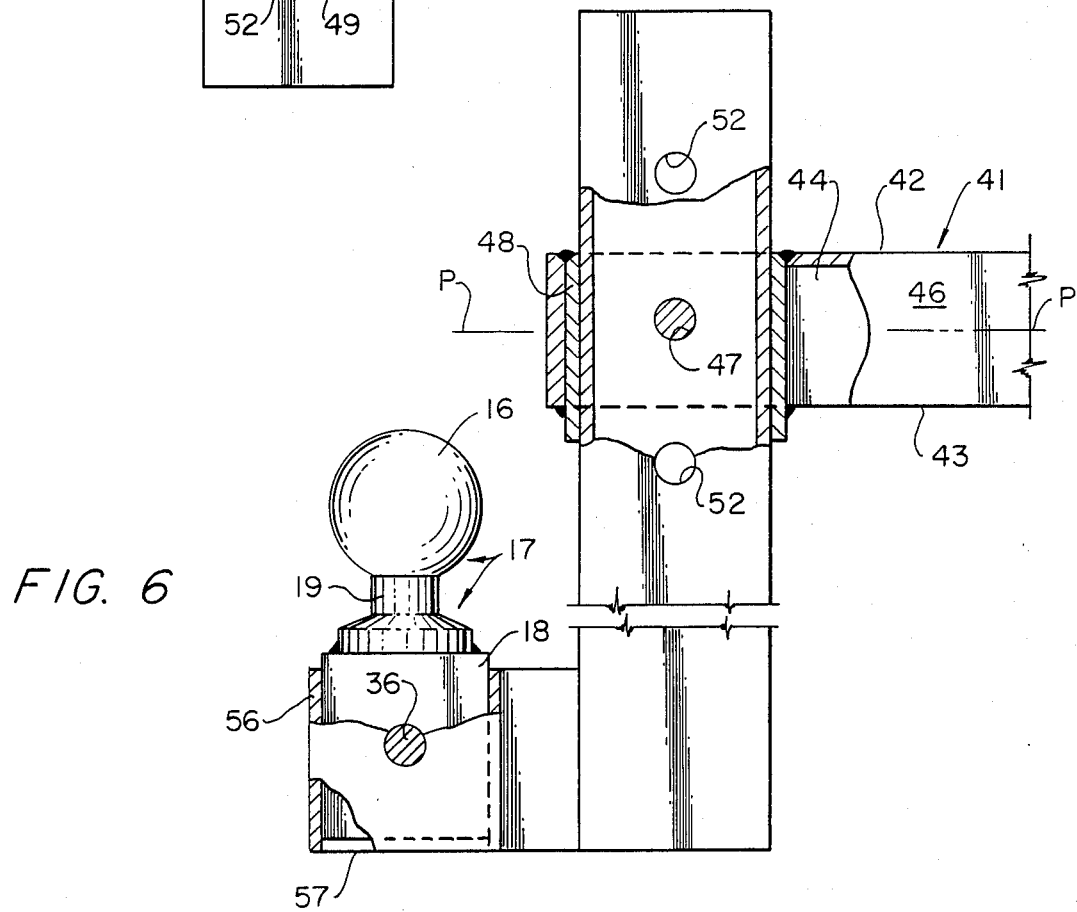
FIG. 6 is a view similar to FIG. 5, but showing the trailer hitch ball support structure reversed 180 degrees to place the trailer hitch ball below the level of a plane that includes the axis of the draw bar.

Referring now to FIG. 6, it will be noted that the versatility of the structure illustrated in FIG. 5 makes itself manifest. Thus, by removing the pin 36, the elongated tube 51 may be reversed 180 degrees in its orientation, so that the sleeve 56 now appears positioned below the plane P. Additionally, by removing the detachable pin 36 from the trailer hitch assembly 17, and reversing the position of the trailer hitch assembly 17, it will be noted that the spherical ball 16 is also now positioned below the plane P. Thus, depending upon the relationship of height between the draw bar 41 of the towing vehicle and the height of the tongue of the vehicle to be towed, the tube 51 may be elevated or lowered in order to properly position the ball 16 to accommodate any differences in these heights.

Figure 7:
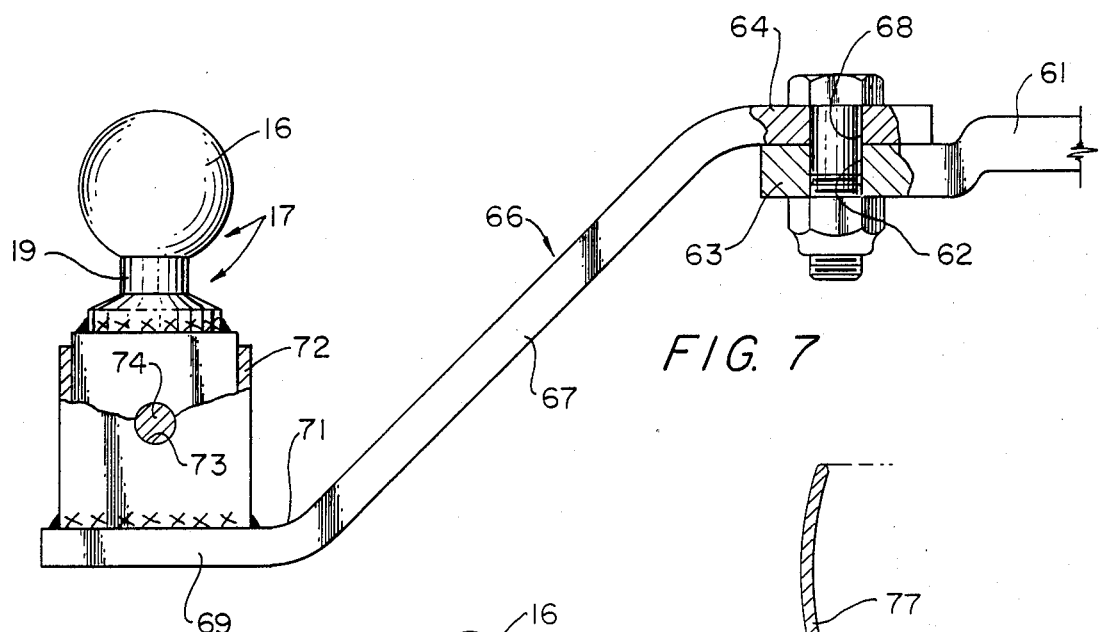
FIG. 7 is a side elevational view of another embodiment that illustrates a socket member permanently mounted on a jogged trailer hitch connector plate, and providing means for releasably locking in the socket member a trailer hitch ball assembly including a monolithic plug that snugly engages and is detachably secured to the socket member.

As previously indicated, many towing vehicles have merely a flat plate, frequently rounded on the end, projecting from under the bumper of the towing vehicle, and provided with an aperture through which the shank of a trailer hitch ball may be inserted to attach the trailer hitch ball to the flat plate or tow bar as it is frequently called. Thus, referring to FIG. 7, it will there be seen that a flat tow bar 61 is provided similar to the tow bar 33 in FIG. 4, the tow bar 61 being provided with an aperture 62. Overlying the offset portion 63 of the tow bar 61 is the attachment portion 64 of a flat bar designated generally by the numeral 66 and having an intermediate portion 67 that is angularly disposed to the attachment portion 64. The end portion 64 of the flat bar is also provided with an aperture 68 which is adapted to be axially aligned with the aperture 62, so that the two portions 63 and 64 may be detachably secured by an appropriate cap screw (not shown). At the opposite end of the flat bar 66, there is provided another end portion 69 that lies parallel to the portion 64, but in an offset plane as illustrated. The end portion 69 provides a mounting surface 71 for a sleeve 72 open at its upper end and closed at its lower end by the end portion 69. The sleeve 72 is attached to the portion 69 by appropriate welding as illustrated.

The sleeve 72, more properly a socket, is preferably square in cross-section, and two of the opposite walls, as illustrated, are provided with aligned apertures 73 adapted to receive a removable lock pin 74 similar to the lock pin 36 illustrated in FIG. 9. The lock pin extends through the aligned aperture 73 in the sleeve 72 and through the bore 21 of the trailer hitch assembly 17 which is dropped into the socket sleeve 72 in such a manner that the bore 21 aligns itself with the apertures 73 in the opposite walls, whereupon the lock pin 74 may be inserted therethrough to lock the assembly in the socket 72 and to the bar 66. Thus, if it is desired to connect the trailer hitch ball 16 to a conventional trailer hitch assembly as illustrated in FIG. 1, all that is required is that the trailer hitch assembly be positioned over the ball 16 and the latch mechanism 7 closed as illustrated in FIG. 2. A padlock may then be inserted through the appropriate apertures in the latch assembly to permanently lock the trailer hitch assembly 17 to the trailer tongue. Then, to disconnect the tractor vehicle from the trailer vehicle, all that is required is that the removable pin 74 be extracted from the apertures 73 and the bore 21, thus freeing the trailer hitch assembly 17 so that it remains locked to the trailer hitch latch assembly. To insure that nobody will steal away with the trailer, all that is required is that the lock pin 73 be reinserted through the bore 21 of the plug member 18 of the trailer hitch assembly 17, and a padlock be placed on the latch bolt instead of the spring clip 38.

Figure 8:
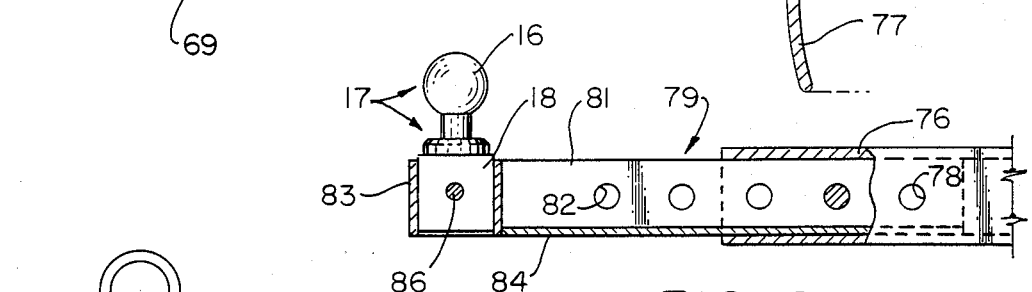
FIG. 8 is a side elevational view of another embodiment of the invention adapted to permit adjustable connection of a connector tube to a conventional receptacle tube, the connector tube having on its free end a socket member adapted to receive the monolithic plug portion of a universal trailer hitch ball assembly.

To further illustrate the versatility of this invention, reference is made to FIG. 8 of the drawings in which the conventional receptacle tube 76 is illustrated projecting below and rearwardly from the automobile or tractor vehicle bumper 77, here shown schematically. As illustrated, the conventional tube 76 is preferably square in cross-section having opposite side walls provided with apertures 78 aligned in a horizontal plane and adapted to receive therethrough a removable lock pin such as the lock pin illustrated in FIG. 9. A multiplicity of laterally spaced apertures are provided, as illustrated, to enable a measure of adjustability of the connector member 79 which in this instance is illustrated as a channel member having flanges 81 also provided with transversely extending aligned apertures 82 as illustrated, pairs of which may be aligned with the aperture 78 in the tube 76 so as to enable locking of the connector member 79 to the receptacle tube 76 in a detachable manner as heretofore explained.

Mounted on the extreme end of the connector member 79 is a socket 83, appropriately welded to the web 84 of the channel connector 79, the socket 83 being tubular, preferably square in cross-section, and adapted to snugly and detachably receive therewithin the plug member 18 of the trailer hitch assembly 17. As previously discussed in connection with the socket 72 of FIG. 7, the socket 83 in FIG. 8 has opposed walls that are appropriately apertured, the apertures being in axial alignment, so as to receive the insertion of a lock pin 86 similar to the lock pin illustrated in FIG. 9, so as to enable detachable locking of the trailer hitch assembly 17 to the socket 83.

Figure 10:
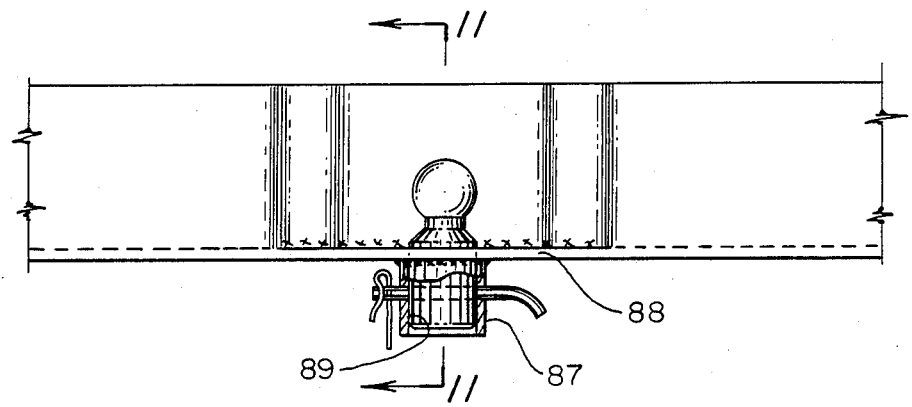
FIG. 10 is a rear elevational view illustrating the universal ball and plug assembly of the invention in combination with a modified vehicle bumper.
Figure 11:
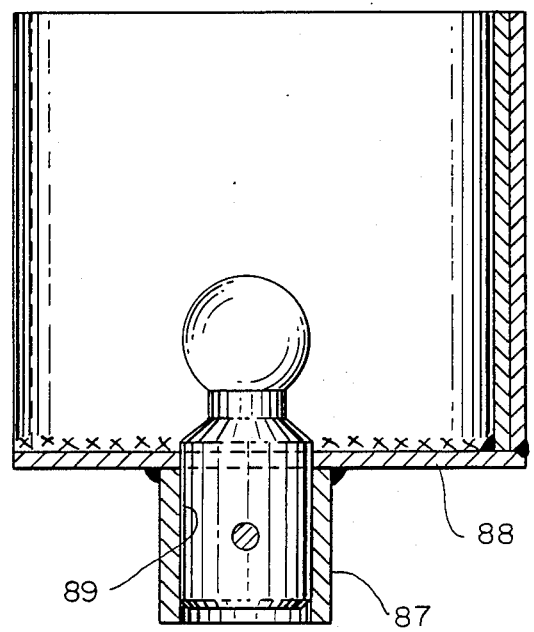
FIG. 11 is a vertical cross-sectional view taken in the plane indicated by the line 11—11 in FIG. 10.

Referring to FIG. 10, it will there be seen that a vehicle bumper of the type that would normally receive the threaded shank of the conventional ball shown in FIGS. 1 and 2, has been modified to incorporate a socket member 87 permanently welded to the draw plate 88 of the bumper, which has been provided with an aperture 89 that complements the size and configuration of the socket member. Thus, the trailer hitch ball assembly 17, as previously described, may be detachably secured to the socket member by the insertion of a pin 36 through appropriate bores formed in the socket and in the monolithic plug portion of the trailer hitch assembly.

It will thus be seen that the trailer hitch assembly 17 including the plug member 18 and the spherical ball member 16 integrally connected together by the intermediate boss 19, is applicable in a trailer hitch assembly as illustrated in FIG. 3, in which the ball is permanently mounted pivotally to the tongue member 8, or is applicable in a variety of ways as illustrated in FIG. 4, where a socket assembly 27 is provided to receive the monolithic plug portion 18, and similarly in FIGS. 5, 6, 7, 8 and 10 as illustrated and described. I knows of no other trailer hitch assembly that provides this kind of versatility.

Having thus described the invention, what is believed to be new and novel and sought to be protected by letters patent of the United States is as follows.

I claim:

1. In a trailer hitch assembly for detachably securing a tractor vehicle to a trailer vehicle, the combination which comprises:
   (a) a spherical trailer hitch ball adapted for pivotal connection to a complementary tongue member on a trailer vehicle; and p1 (b) a monolithic plug portion having at least one flat side and integrally connected to said spherical trailer hitch ball and adapted for detachable non-rotatable connection to a tractor vehicle whereby the tractor vehicle may be detachably connected to the trailer vehicle.

2. The combination according to claim 1, in which means are provided for detachable attachment to said tractor vehicle and having a flat surface complementary to said at least one flat side of said monolithic plug portion to snugly and slidably receive said monolithic plug portion whereby said spherical trailer hitch ball may be detachably locked nonrotatably to said tractor vehicle.

3. The combination according to claim 2, in which said means in which said monolithic plug portion is snugly and slidably detachably engaged comprises a socket member having a recess complementary in configuration to the configuration of said monolithic plug portion including said at least one flat surface, and means are provided for detachably locking said monolithic plug portion non-rotatably within said socket member.

4. The combination according to claim 3, in which means are provided on said socket member for detachably securing said socket member non-rotatably to said tractor vehicle.

5. The combination according to claim 4, in which said means for attaching said socket to said tractor vehicle comprises a threaded spindle integral with said socket and a complementary nut adapted to detachably secure the socket non-rotatably to the draw bar of the tractor vehicle.

6. The combination according to claim 1, in which said spherical ball is permanently attached pivotally to said tongue portion of the trailer vehicle.

7. In a trailer hitch assembly for detachably securing a tractor vehicle to a trailer vehicle, the combination which comprises:
   (a) a spherical trailer hitch ball adapted for pivotal connection to a complementary tongue member on a trailer vehicle;
   (b) a monolithic plug portion integrally connected to said spherical trailer hitch ball and adapted for detachable connection to a tractor vehicle whereby the tractor vehicle may be detachably connected to the trailer vehicle;
   (c) means for detachable attachment to said tractor vehicle to snugly and slidably receive said monolithic plug portion whereby said spherical trailer hitch ball may be detachably locked to said tractor vehicle;
   (d) said means in which said monolithic plug portion is snugly and slidably detachably engaged comprising a socket member having a recess complementary in configuration to the configuration of said monolithic plug portion;
   (e) means for detachably locking said monolithic plug portion within said socket member;
   (f) means on said socket member for detachably securing said socket member to said tractor vehicle; and
   (g) said means by attaching said socket to the tractor vehicle comprises an elongated generally flat bar having spaced mounting portions connected by an angularly disposed connector portion, said socket being mounted on one of said mounting portions while the other mounting portion is adapted to be detachably secured to said tractor vehicle.

8. In a trailer hitch assembly for detachably securing a tractor vehicle to a trailer vehicle, the combination which comprises:
   (a) a spherical trailer hitch ball adapted for pivotal connection to a complementary tongue member on a trailer vehicle;
   (b) a monolithic plug portion integrally connected to said spherical trailer hitch ball and adapted for detachable connection to a tractor vehicle whereby the tractor vehicle may be detachably connected to the trailer vehicle;
   (c) means for detachable attachment to said tractor vehicle to snugly and slidably receive said monolithic plug portion whereby said spherical trailer hitch ball may be detachably locked to said tractor vehicle;
   (d) said means in which said monolithic plug portion is snugly and slidably detachably engaged comprising a socket member having a recess complementary in configuration to the configuration of said monolithic plug portion;
   (e) means for detachably locking said monolithic plug portion within said socket member;
   (f) means on said socket member for detachably securing said socket member to said tractor vehicle; and
   (g) said means for attaching the socket to the tractor vehicle comprising an elongated connector member in the form of a U-shape channel having a web member and perpendicular flanges thereon, said flanges being provided with a multiplicity of pairs of spaced apertures therethrough, said socket is permanently attached to one end of said connector member, and said apertures in the connector member are adapted to receive a detachable lock pin for locking the connector member to the trailer hitch receptacle tube on the tractor vehicle.

9. In a trailer hitch assembly for detachably securing a tractor vehicle to a trailer vehicle, the combination which comprises:
   (a) a spherical trailer hitch ball adapted for pivotal connection to a complementary tongue member on a trailer vehicle;
   (b) a monolithic plug portion integrally connected to said spherical trailer hitch ball and adapted for detachable connection to a trailer vehicle whereby the trailer vehicle may be detachably connected to the trailer vehicle;
   (c) means for detachable attachment to said tractor vehicle to snugly and slidably receive said monolithic plug portion whereby said spherical trailer hitch ball may be detachably locked to said tractor vehicle;
   (d) said means in which said monolithic plug portion is snugly and slidably detachably engaged comprising a socket member having a recess complementary in configuration to the configuration of said monolithic plug portion;
   (e) means for detachably locking said monolithic plug portion within said socket member;
   (f) means on said socket member for detachably securing said socket member to said tractor vehicle; and
   (g) said means for attaching said socket to said tractor vehicle comprises a receptacle sleeve permanently mounted on said tractor vehicle, an elongated connector bar slidably disposed in said sleeve and having a multiplicity of pairs of apertures through said bar selectively adjustable into registry with complementary apertures formed in said receptacle sleeve, said socket member constituting a tube open at both ends and having walls defining the configuration of the monolithic plug portion of said trailer hitch assembly, two of the opposite walls of said sleeve having aligned apertures adapted to register with a transverse bore formed in said monolithic plug portion of said trailer hitch assembly, a first detachable lock means for locking said elongated bar detachably to said receptacle sleeve mounted on said trailer vehicle, and a second detachable lock means adapted to extend through the apertures in said socket and the transverse bore in said monolithic plug portion of said trailer hitch assembly when said apertures and said bore are in registry whereby said trailer hitch assembly is detachably secured to said open ended socket.

10. In a trailer hitch assembly for detachably securing a trailer vehicle to a trailer vehicle, the combination which comprises:
   (a) a spherical trailer hitch ball adapted for pivotal connection to a complementary tongue member on a trailer vehicle;
   (b) a monolithic plug portion integrally connected to said spherical trailer hitch ball and adapted for detachable connection to a tractor vehicle whereby the tractor vehicle may be detachably connected to the trailer vehicle;
   (c) means for detachable attachment to said tractor vehicle to snugly and slidably receive said monolithic plug portion whereby said spherical trailer hitch ball may be detachably locked to said tractor vehicle;
   (d) said means in which said monolithic plug portion is snugly and slidably detachably engaged comprising a socket member having a recess complementary in configuration to the configuration of said monolithic plug portion;
   (e) means for detachably locking said monolithic plug portion within said socket member; and
   (f) said socket member is permanently secured to a vehicle bumper, and an aperture is provided in said bumper in alignment with said socket member whereby said monolithic plug portion may be inserted into said socket member through said aperture.

* * * * *